(12) United States Patent
Bohn

(10) Patent No.: US 6,350,980 B1
(45) Date of Patent: Feb. 26, 2002

(54) IMAGING ASSEMBLY WITH A SIDE MOUNTED OPTICAL DETECTOR FOR A SCANNER

(75) Inventor: David D. Bohn, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/385,123

(22) Filed: Aug. 27, 1999

(51) Int. Cl.[7] ............................................... G01N 21/86
(52) U.S. Cl. ..................................... 250/208.1; 358/482
(58) Field of Search ....................... 250/208.1; 358/474, 358/482, 483, 493, 494; 382/312, 321

(56) References Cited

U.S. PATENT DOCUMENTS

| | | | |
|---|---|---|---|
| 5,089,712 A | 2/1992 | Holland | 250/557 |
| 5,270,840 A | * 12/1993 | Ogata et al. | 358/482 |
| 5,306,908 A | 4/1994 | McConica et al. | 250/234 |
| 5,381,020 A | 1/1995 | Kochis et al. | 250/566 |
| 5,552,597 A | 9/1996 | McConica | 250/234 |
| 5,578,813 A | 11/1996 | Allen et al. | 250/208.1 |
| 5,586,212 A | 12/1996 | McConica et al. | 385/146 |
| 6,160,250 A | * 12/2000 | Miksch et al. | 250/208.1 |

* cited by examiner

Primary Examiner—Stephone Allen (57) ABSTRACT

An optical imaging assembly comprises a mounting surface and at least one semiconductor die having a face and an edge portion. The edge portion of the at least one semiconductor die is mounted to the mounting surface. A light sensitive optical detector is located on the face of the at least one semiconductor die. An optical system is mounted to the mounting surface adjacent the at least one semiconductor die.

23 Claims, 6 Drawing Sheets

IMAGING ASSEMBLY WITH A SIDE MOUNTED OPTICAL DETECTOR FOR A SCANNER

FIELD OF THE INVENTION

This invention relates to scanner devices in general and more specifically to a scanner optical imaging assembly mounted on a single circuit board with one or more edge mounted optical detectors.

BACKGROUND

Optical scanner devices are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer. Some examples of optical scanner devices are fax machines, digital copiers, and computer scanners (flatbed and portable).

Optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical optical scanner may include an optical imaging assembly comprising illumination, optical, and detection systems. The illumination source illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. The photosensitive detector converts the image light incident thereon into electrical signals representative of the scan line. Image data representative of the entire object then may be obtained by sweeping the scan line across the entire object.

The term "image light" as used herein refers to the light reflected from the document and focused onto the surface of the detector array by the optical system. The image light may be converted into digital signals in essentially three steps. First, the photosensitive optical detector converts the light it receives into a varying electric current. Second, the varying electric currents from the detector elements are converted into analog voltages by an analog amplifier. Finally, the analog voltages are digitized by an analog-to-digital (A/D) converter. The digital data then may be processed and/or stored as desired.

While optical scanners of the type described above are being used, they are not without their problems. Image quality, scanner size and cost, and ease of assembly are related to the design and complexity of the optical imaging assembly. For example, the various components of the imaging assembly, i.e., the illumination source, the optical system and the detection system, must be precisely aligned to properly illuminate the document and focus the image light onto the detectors. The position, orientation, and distance of each element with respect to other elements must be correct to within close tolerances. Furthermore, the imaging assembly must be robust enough to resist shifting when the optical scanner is jolted or the operating environment varies.

If the illumination source is not properly aligned, the scan region may be too dark and the resulting image may lack contrast. If the image light is not properly focused and directed onto the detectors, the resulting image may be blurry or dark. Complex mounting and alignment systems may be employed to address these problems. However, a complex imaging assembly results in a relatively large, costly, and error prone optical scanner. Furthermore, the more complex the imaging assembly, the more difficult it is to assemble, and the more likely elements are to shift out of alignment.

Highly complex imaging assemblies also have a large tolerance stack. It is impossible to manufacture each part to the exact design measurements, therefore each part has a design tolerance, or an acceptable amount of error in size or shape. As parts are placed next to each other during design, the tolerance of each is added to a tolerance stack. Therefore, when elements of the imaging assembly are separated by a relatively large number of parts, the tolerance stack between the parts is relatively large, and the alignment error may be large enough to reduce image quality.

A complex imaging assembly with a large number of parts also results in a large optical scanner which is very difficult to scale down.

Consequently, a need exists for a smaller imaging assembly which is simple to assemble and align, resulting in a lower cost. A need further exists for an imaging assembly having a reduced tolerance stack to improve alignment and simplify assembly or repair.

SUMMARY

To assist in achieving the aforementioned needs, the inventor has devised an optical imaging assembly with at least one edge mounted optical detector which is smaller and which greatly simplifies assembly and alignment. This provides for smaller, lighter, and less expensive scanners in general.

The invention may comprise an optical imaging assembly having a mounting surface and at least one semiconductor die with a face and an edge portion. The edge portion of the at least one semiconductor die is mounted to the mounting surface. A light sensitive optical detector is located on the face of the at least one semiconductor die. An optical system is mounted to the mounting surface adjacent the at least one semiconductor die.

The invention may also comprise a method of producing an imaging system including providing at least one photodetector having a light sensitive face and an edge portion, connecting the edge portion of the at least one photodetector to a circuit board, and connecting a lens to the circuit board adjacent the at least one photodetector.

The invention may also comprise a method for assembling an optical imaging assembly. The method comprises providing at least one optical detector having a light sensitive face, an edge portion, and a first plurality of electrical contact pads placed adjacent the edge portion. The method further comprises providing a substrate having a second plurality of electrical contact pads corresponding to the first plurality of electrical contact pads. The method further comprises placing the edge portion of the at least one optical detector against the substrate, aligning the first plurality of electrical contact pads with the second plurality of electrical contact pads, and electrically connecting the first plurality of electrical contact pads to the second plurality of electrical contact pads.

BRIEF DESCRIPTION OF THE DRAWING

Illustrative and presently preferred embodiments of the invention are shown in the accompanying drawing, in which.

DESCRIPTION OF THE PREFERRED EMBODIMENT

The drawing and description, in general, disclose an optical imaging assembly 40 comprising a mounting surface 42 and at least one semiconductor die 86 having a face 90 and an edge portion 80. The edge portion 80 of the at least one semiconductor die 86 is mounted to the mounting surface 42. A light sensitive optical detector 92 is located on the face 90 of the at least one semiconductor die 86. An optical system 44 is mounted to the mounting surface 42 adjacent the at least one semiconductor die 86.

The drawing and description also disclose a method of producing an imaging system including providing at least one photodetector 86 having a light sensitive face 92 and an edge portion 80, connecting the edge portion 80 of the at least one photodetector 86 to a circuit board 42, and connecting a lens 44 to the circuit board 42 adjacent the at least one photodetector 86.

The drawing and description also disclose a method for assembling an optical imaging assembly 40. The method comprises providing at least one optical detector 86 having a light sensitive face 92, an edge portion 80, and a first plurality of electrical contact pads (e.g., 132 and 140) placed adjacent the edge portion. The method further comprises providing a substrate 42 having a second plurality of electrical contact pads (e.g., 130 and 136) corresponding to the first plurality of electrical contact pads 132 and 140. The method further comprises placing the edge portion 80 of the at least one optical detector 86 against the substrate 42, aligning the first plurality of electrical contact pads 132 and 140 with the second plurality of electrical contact pads 130 and 136, and electrically connecting the first plurality of electrical contact pads 132 and 140 to the second plurality of electrical contact pads 130 and 136.

Figure 6:
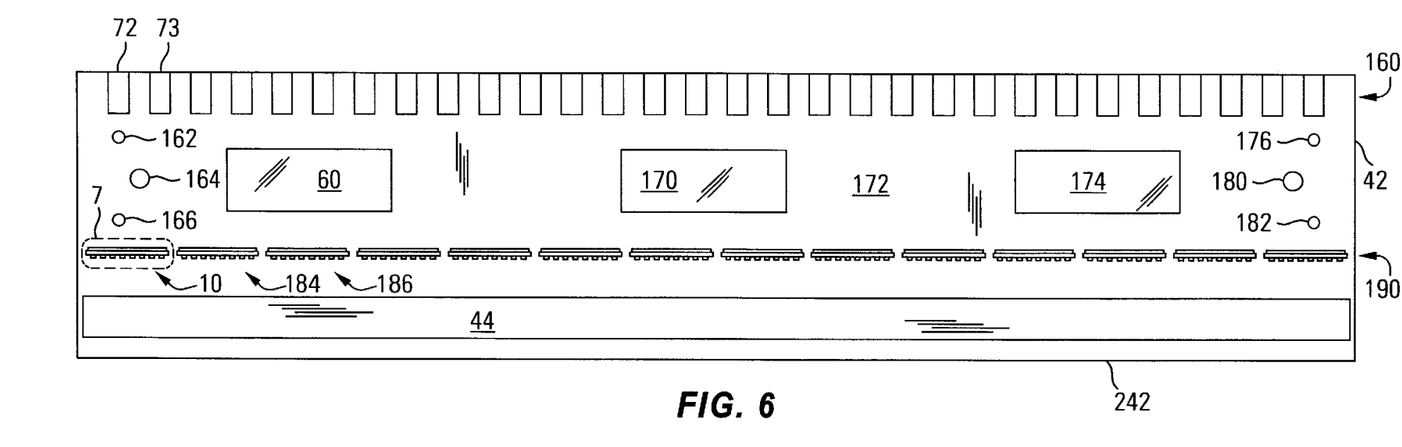
FIG. 6 is a front view of the optical imaging assembly of FIG. 4.

An optical imaging assembly 40 having at least one edge mounted optical detector (e.g., 10) according to the present invention may be used in a hand-held or portable image scanner 12 to scan an object 14, such as a document 16 with written text 18 provided thereon. The optical imaging assembly 40 of a preferred embodiment includes an array 190 of 14 edge mounted optical detectors (e.g., 10, 184, and 186, FIG. 6). The array of edge mounted optical detectors 190 work together to scan an elongated region or line on a document 16.

Figure 1:
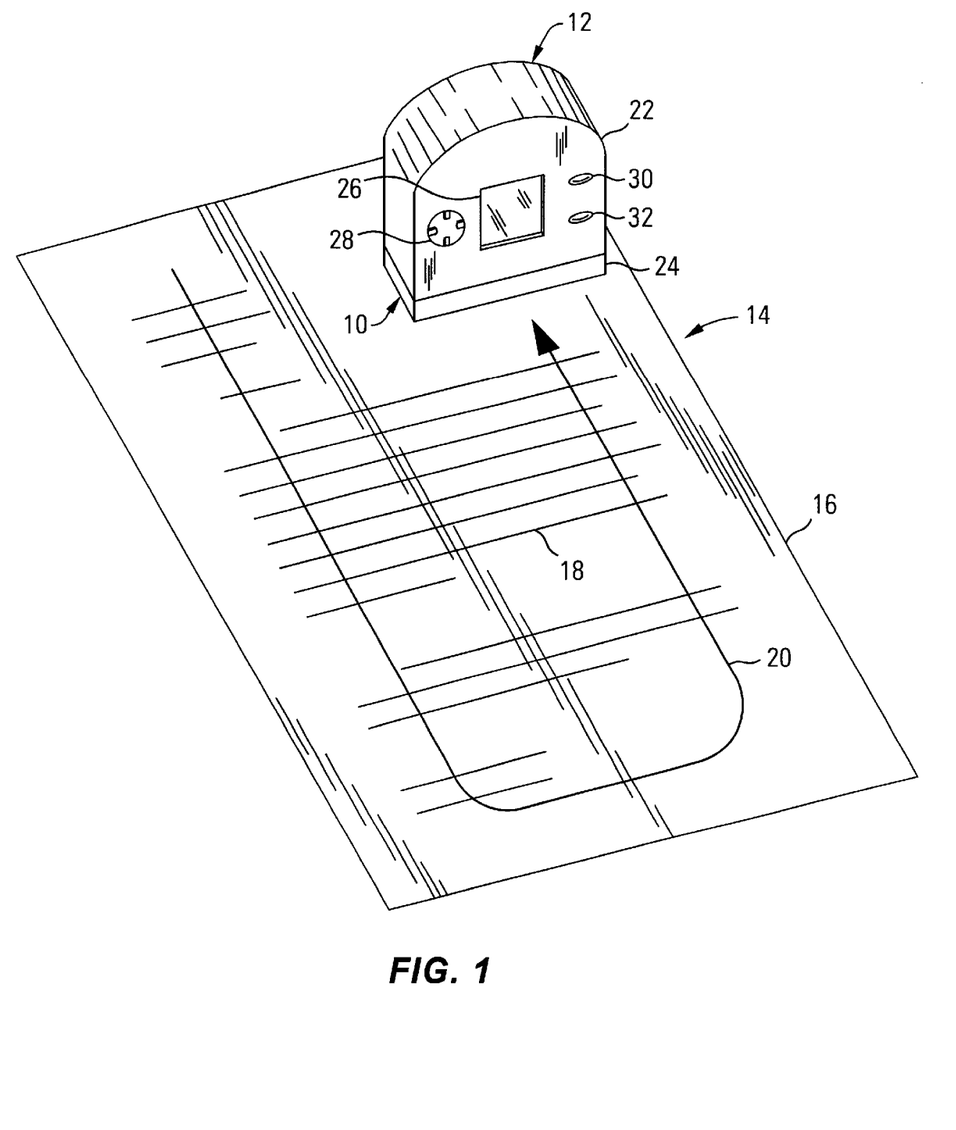
FIG. 1 is a perspective view of a portable scanner device having an optical imaging assembly with an edge mounted optical detector.

For example, in the application illustrated in FIG. 1, the entire document 16 may be scanned by moving the portable image scanner 12 over the document 16 along a meandering or curvilinear scanning path 20. As will be explained in greater detail below, the array of edge mounted optical detectors 190 associated with the portable image scanner 12 detect image light reflected from the document 16 to create a computer readable representation of the text 18 on the document 16. The array of edge mounted optical detectors 190 significantly reduces the size of the optical imaging assembly 40. The array of edge mounted optical detectors 190 also simplifies the alignment of the imaging components and reduces the required mounting hardware. The quality of the image data produced by the array of edge mounted optical detectors 190 is thereby generally improved. Assembly and repair of the scanner 12 is also simplified, and size, weight, and cost is reduced.

Figure 2:
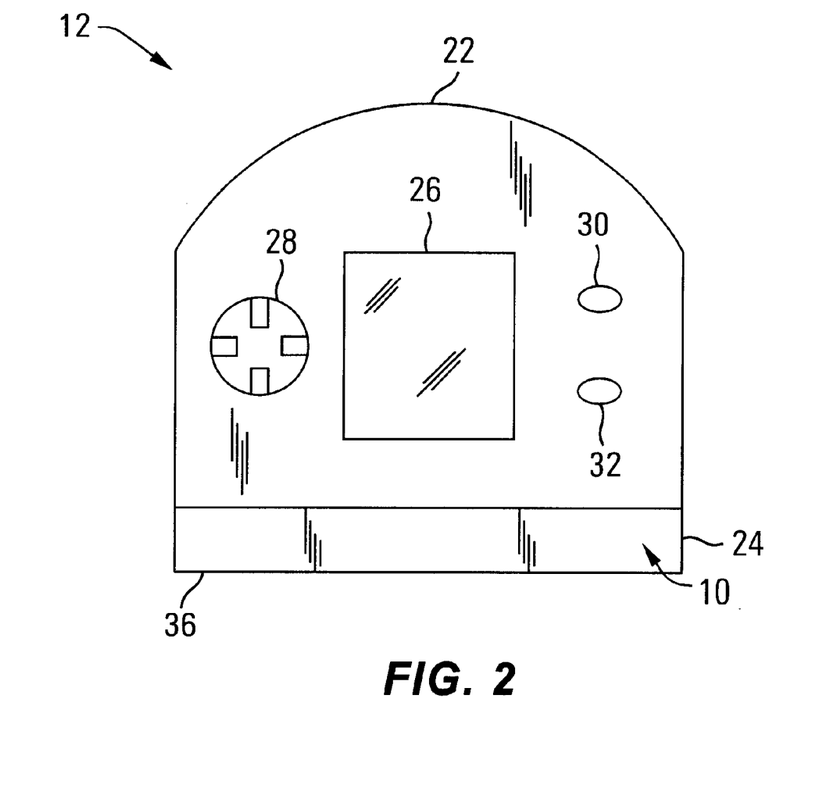
FIG. 2 is a front view of the portable scanner device shown in FIG. 1.
Figure 3:
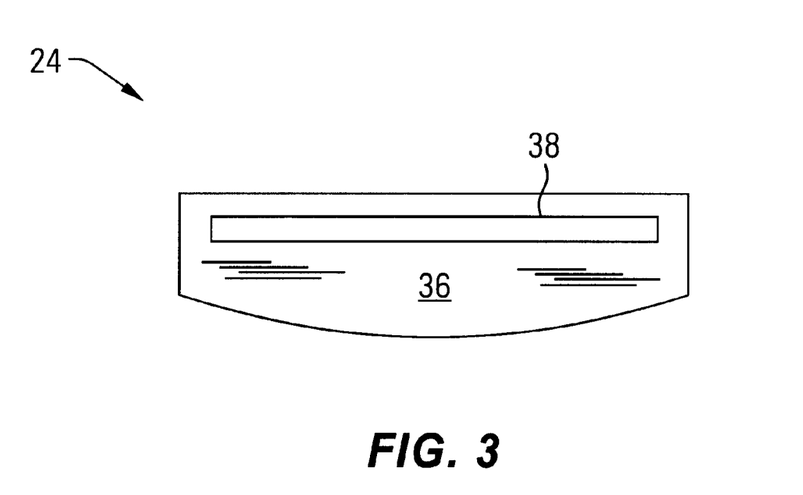
FIG. 3 is a bottom view of the portable scanner device showing the contact surface of the image head.

Referring now to FIG. 2, one embodiment of the portable image scanner 12 having an array of edge mounted optical detectors 190 may comprise a main housing portion 22 having an image head portion 24 associated therewith. The main housing portion 22 of the portable image scanner 12 may be sized to receive the various electronic components and other devices (not shown) required for the operation of the portable image scanner 12. For example, in addition to housing the various electronic components that may be required or desired for the operation of the portable image scanner 12, the main housing portion 22 may also be provided with a display device 26, along with various buttons or switches 28, 30, and 32 to control the function and operation of the portable image scanner 12. The main housing portion 22 may also be sized to receive a suitable power source, such as a battery (not shown), to provide electrical power to the portable image scanner 12.

The image head portion 24 of portable image scanner 12 may be configured to receive an optical imaging assembly 40. The optical imaging assembly 40 is a contact image sensor, a type of imaging assembly which is generally placed in contact with the document 16. The photodetectors used in the contact image sensor are the same size as the target area on the document 16, so reduction optics are not needed.

Figure 4:
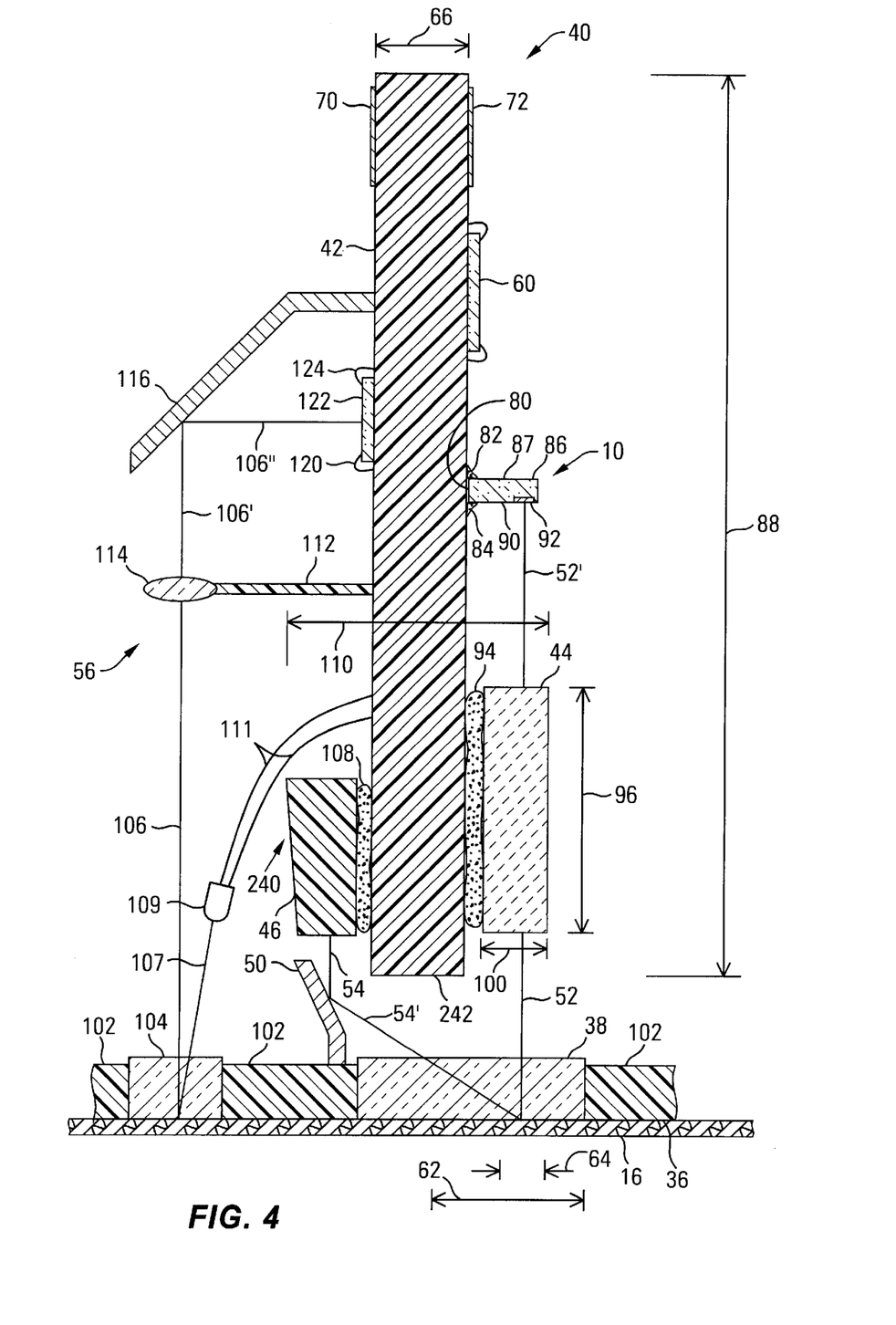
FIG. 4 is a cross-sectional end view of an optical imaging assembly with at least one edge mounted optical detector.

A stabilizer base 102 (FIG. 4) with a face or contact surface 36 is provided in the image head portion 24 to position against the document 16. The stabilizer 102 is provided with an elongate imaging window 38 therein which allows the optical imaging assembly 40 to illuminate a scan region 62 on the document 16. The imaging window 38 also allows image light 52 reflected by the illuminated scan region 62 to be received by the array of edge mounted optical detectors 190. The array of edge mounted optical detectors 190 produces an image signal (not shown) based on the image light 52. Image data contained in the image signal may then be processed or manipulated by an image processing system 60 to produce image data that are representative of the object 14.

An edge mounted optical detector (e.g., 10) is an optical detector or photodetector which is mounted to a mounting surface, such as a printed circuit board 42, on its side, or edge, so that the light sensitive region 92 is directed parallel to the printed circuit board 42. In contrast, a traditional photodetector is mounted on its back so that the light sensitive region is directed away from and perpendicular to the printed circuit board. The printed circuit board having a traditional photodetector may be oriented parallel to the document, with a lens positioned between the photodetector and the document, but this requires additional mounting hardware and results in a complex optical imaging assembly with a large tolerance stack. The printed circuit board may also be oriented perpendicular to the document, with the lens mounted to the printed circuit board below the photodetector, but this configuration requires a reflector such as a mirror to direct the light from the lens over to the photodetector, resulting in a relatively bulky optical imaging assembly.

An edge mounted optical detector (e.g., 10) may comprise a semiconductor die 86 with a light sensitive region 92. The semiconductor die 86 is not packaged in a housing like a typical integrated circuit, but is provided with conductive interconnect pads (e.g., 132, 140, FIG. 5) adjacent an edge 80 so that the semiconductor die 86 may be mounted directly to the printed circuit board 42. The array of edge mounted optical detectors 190 significantly reduces the size of the optical imaging assembly 40 and aids alignment and assembly by mounting the imaging components on a single mounting surface 42. The imaging components may be mounted to the mounting surface 42 during one manufacturing process which may be automated, avoiding manual assembly and alignment. The array of edge mounted optical detectors 190 also significantly improves tolerance control by removing intermediate bodies such as multiple mounting brackets from the tolerance stack.

The optical imaging assembly 40 comprises an array of edge mounted optical detectors 190, an optical system 44, and an illumination source 240, all attached to a mounting surface 42. The optical imaging assembly 40 having an array of edge mounted optical detectors 190 may also comprise an illumination reflector 50 to direct the illumination light 54. One or more position detectors 56 and various integrated circuits such as an image processing circuit or system 60 may also be mounted on the mounting surface 42. The illumination source 240 first illuminates a scan region 62 on the document 16. In a preferred embodiment, the illumination source 240 directs the illumination light 54 towards the illumination reflector 50, which reflects the illumination light 54' down to the scan region 62 at an angle. The illumination light 54' reflects off the document 16 as reflected image light 52. The intensity of the image light 52 varies as a function of the text 18 or graphics (not shown) on the document 16. Lighter areas on the document 16 reflect more intense image light 52 than dark areas.

The image light 52 is reflected from a scan line region 64 on the document 16 to the optical system 44 which focuses and directs it. The image light 52' travels from the optical system 44 to the array of edge mounted optical detectors 190 which converts the image light 52' into electrical signals which are representative of the text 18 or graphics on the document 16. The electrical signals may be further conditioned or processed by the image processing circuit 60 also mounted to the mounting surface 42.

In a preferred embodiment, the mounting surface 42 comprises a printed circuit board, to which the imaging components (e.g., the array of edge mounted optical detectors 190, optical system 44, and illumination source 240) may be hand mounted using mounting jigs and fixtures, or preferably, automatically mounted through the use of robotics during the manufacturing process. The method of component attachment may be conductive epoxy, solder, glue, clipping, heat staking, or any of a number of conventional attachment methods known in the art. The array of edge mounted optical detectors 190 is preferably automatically mounted using a conductive epoxy which is then cured. The use of an array of edge mounted optical detectors 190 greatly reduces the size and the number of parts required in the scanner 12 and the manual labor involved in assembly and alignment, since the number of mounting and alignment components is reduced.

The portable image scanner 12 having an optical imaging assembly 40 with an array of edge mounted optical detectors 190 may be operated as follows to scan an object 14, such as document 16 with written text 18 thereon. As a first step, the user (not shown) would set up or initialize the portable image scanner 12 to perform the scanning operation by actuating the appropriate buttons or switches (e.g., 28, 30, and 32) in accordance with the particular operational sequence for the specific scanner device. The user may then place the contact surface or face 36 of the portable image scanner 12 against the document 16 and initiate the scanning operation. The user then moves the portable image scanner 12 across the document 16 as the array of edge mounted optical detectors 190 produces an electrical representation of the document 16.

Having briefly described the optical imaging assembly 40 with an array of edge mounted optical detectors 190 and its use in a portable image scanner 12, as well as some of its more significant features and advantages, the various embodiments of the optical imaging assembly 40 with an array of edge mounted optical detectors 190 will now be described in detail. However, before proceeding with the detailed description it should be noted that while the optical imaging assembly 40 with an array of edge mounted optical detectors 190 is shown and described herein as it could be used in a portable image scanner 12, it is not limited to use with any particular type or style of scanner device. For example, the optical imaging assembly 40 could also be used in a flatbed scanner or fax machine. It should also be noted that while the portable image scanner 12 is shown and described herein as it may be used to scan an object 14, such as a document 16 with written text 18 thereon, it is not limited to use with any particular type of object 14. Indeed, the portable image scanner 12 may be used to scan almost any type of object imaginable. Accordingly, the optical imaging assembly 40 with an array of edge mounted optical detectors 190 according to the present invention should not be regarded as limited to the particular type of portable scanner device and applications shown and described herein.

With the foregoing considerations in mind, one embodiment of the optical imaging assembly 40 with an array of edge mounted optical detectors 190 is shown and described herein as it could be used in a portable or hand-held image scanner 12 which may be used to scan an object 14, such as a document 16 with written text 18 thereon. See FIG. 1. In order to scan the entire document 16, it may be necessary for the user to move the portable image scanner 12 along a curvilinear or meandering scanning path 20. If so, the portable scanner device 12 may be provided with a navigation system 56 to allow image data (not shown) obtained along the meandering or curvilinear scanning path 20 to be "stitched" together to provide image data representative of the entirety of the scanned object 14. Exemplary navigation systems and stitching algorithms are disclosed in U.S. Pat. No. 5,089,712 of Holland for "Sheet Advancement Control System Detecting Fiber Pattern of Sheet" and U.S. Pat. No. 5,578,813 of Allen, et al., for "Freehand Image Scanning Device which Compensates for Non-Linear Movement," both of which are specifically incorporated herein by reference for all that they disclose. However, since the details of the stitching algorithm that may be used in such a portable image scanner 12 are not necessary to understand or practice the present invention, the particular stitching algorithm that may be utilized a portable image scanner 12 will not be described in further detail herein.

Referring now primarily to FIGS. 1–2, a portable image scanner 12 employing an optical imaging assembly 40 with an array of edge mounted optical detectors 190 may be provided with a main housing portion 22 and an image head portion 24. The main housing portion 22 may comprise an overall configuration or shape conducive to hand manipulation by a user (not shown), although other configurations may also be used. In one preferred embodiment, the main housing portion 22 may be sized to receive the various electronic components (not shown) required for the operation of the portable image scanner 12. Alternatively, some or all of the various electronic components may be located elsewhere and may be connected to the main housing portion 22 by a suitable link, such as a cable (not shown). The main housing portion 22 may also be provided with a display device 26 and various switching devices 28, 30, and 32 that may be required or desired for the operation of the portable image scanner 12. While the switching devices 28, 30, and 32 in one preferred embodiment are located on the front face of the main housing portion 22 of the portable image scanner 12, they may be positioned at any convenient location on the scanner 12. The electrical power required to operate the portable image scanner 12 may be provided by a suitable electrical power source, such as a battery (not shown), that may also be contained within the main housing portion 22 of the portable image scanner 12. However, since the various electronic components, display devices, switching devices, and batteries that may be required or desired for use in a particular portable image scanner are well-known in the art and since descriptions of the various components are not required to understand or practice the present invention, the various components, e.g., electronic components (not shown), display device 26, switching devices 28, 30, and 32, etc., utilized in one preferred embodiment of the portable image scanner 12 will not be described in further detail herein.

The main housing portion 22 of the portable image scanner 12 may be made from any of a wide range of materials, such as metals or plastics, suitable for the intended application. By way of example, in one preferred embodiment, the main housing portion 22 is made of polycarbonate plastic, although other materials could also be used.

The image head portion 24 is sized to receive an optical imaging assembly 40 with an array of edge mounted optical detectors 190, as illustrated in FIGS. 4–7. In a preferred embodiment, the optical imaging assembly 40 comprises an array of edge mounted optical detectors 190, an optical system 44, and an illumination source 240 mounted on a mounting surface 42. The mounting surface 42 may comprise a printed circuit board containing the electrical wiring to connect the various elements of the optical imaging assembly 40. This also provides the benefit of aiding in component alignment, since the electrical traces and solder pads on a printed circuit board are precisely positioned, providing a precise reference to position the components on the board. Furthermore, the electrical components may be mounted and soldered to the printed circuit board by automated machinery, speeding assembly and lowering costs while correctly aligning the components.

The printed circuit board 42 of the preferred embodiment is a thin circuit board with a thickness 66 of about 0.8 mm. The printed circuit board 42 may also be a standard circuit board with a thickness of about 1.58 mm. Alternatively, the mounting surface 42 may comprise a flexible printed circuit with stiffeners (not shown) placed near the array of edge mounted optical detectors 190, the optical system 44, and the illumination source 240.

Figure 5:
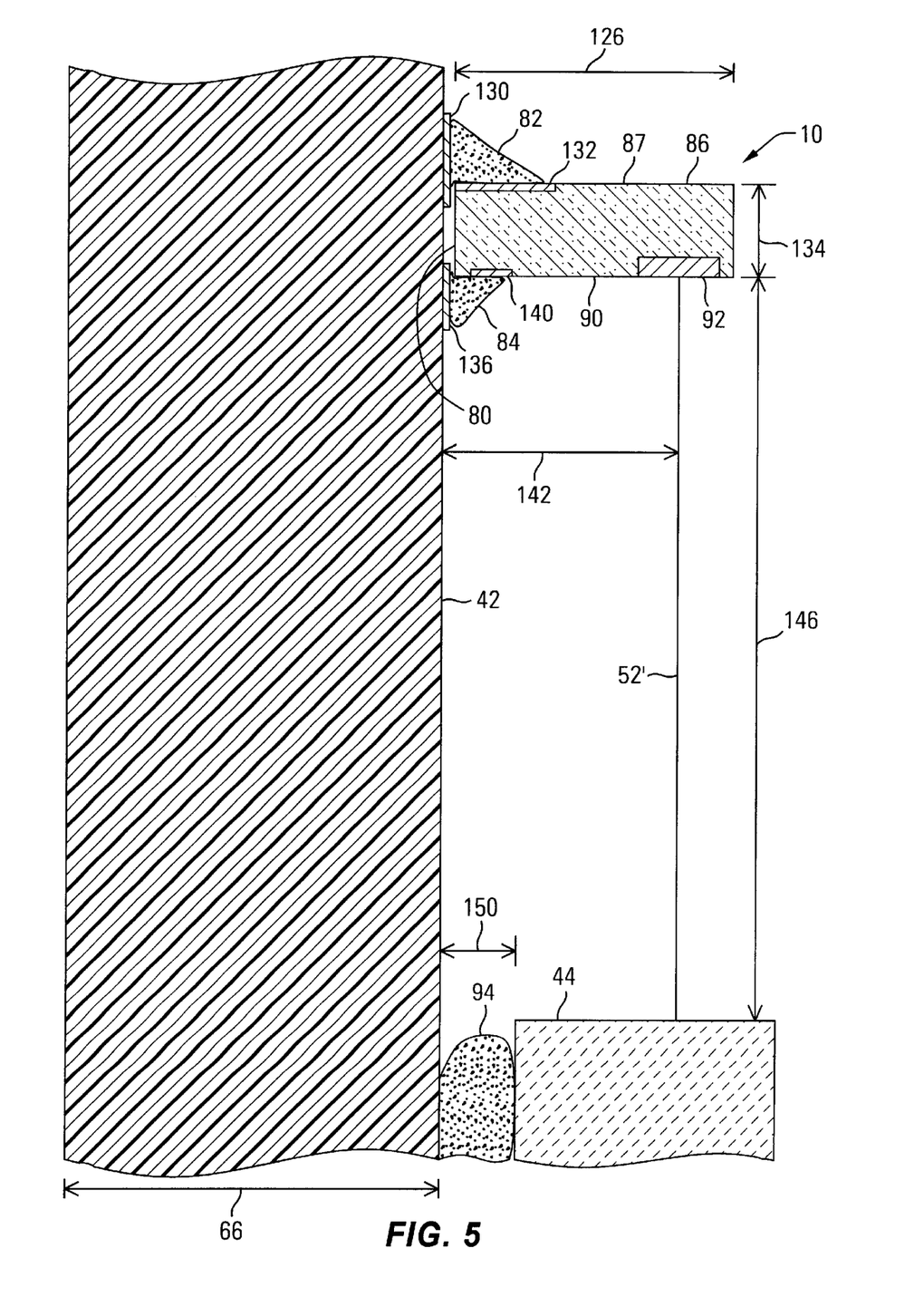
FIG. 5 is a cross-sectional end view showing details of an edge mounted optical detector of FIG. 4.
Figure 7:
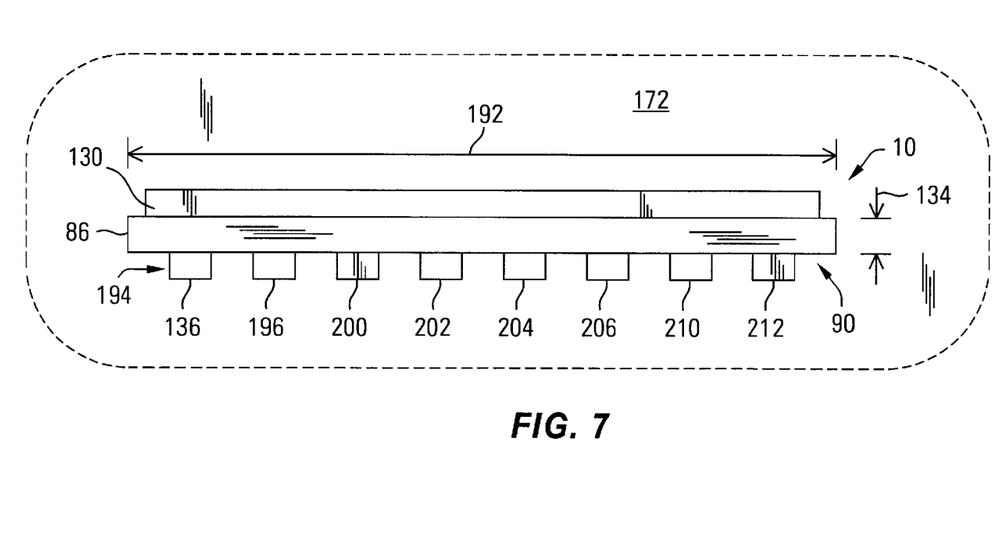
FIG. 7 is a detail front view of an edge mounted optical detector.

The array of edge mounted optical detectors 190 preferably comprises a linear array of elongated photodetectors on semiconductor dice (e.g., 10, 184, and 186, FIG. 6) mounted side by side on the front 172 of the printed circuit board 42. Each edge mounted optical detector (e.g., 10) is a semiconductor die 86 with a light sensitive region 92 fabricated on the face 90 of the die 86. The light sensitive region 92 may be fabricated on the die 86 using well-known semiconductor fabrication techniques, or using any techniques which may be developed in the future. The semiconductor die 86 of the preferred embodiment is best seen in FIGS. 5 and 7, and has a height 134 of about 0.38 mm, a length 192 of about 8 mm, and a width 126 of about 1 mm, although the dimensions of the semiconductor die 86 may vary depending on the fabrication methods and the requirements for the portable image scanner 12.

The edge mounted optical detector (e.g., 10) is mounted to the printed circuit board 42 on its edge 80. The edge 80 is preferably perpendicular to the face 90 with the light sensitive region 92, but the semiconductor die 86 may also be cut from a silicon wafer on an angle, so that the edge 80 forms an oblique angle with the face 90. A set of conductive pads (e.g., 140, 132) are formed on the semiconductor die 86 so that it may be electrically connected to the printed circuit board 42. The conductive pads preferably comprise an elongate ground pad 132 and a set or plurality of interconnect pads 136, 196, 200, 202, 204, 206, 210, and 212. The conductive pads 132, 136, and 196-212 are fabricated on the semiconductor die 86 in a metal layer during the semiconductor fabrication process.

The elongate ground pad 132 is located on a back side 87 of the semiconductor die 86 adjacent the edge 80, and is substantially coextensive with the length 192 of the die 10 to provide a good ground connection with the printed circuit board 42. Alternatively, the elongate ground pad 132 may be located on the face 90 of the semiconductor die 86.

The set of interconnect pads 136 and 196-212 are located on the face 90 of the semiconductor die 86 adjacent the edge 80. The number of interconnect pads 136 and 196-212 is dependent on the resolution of the light sensitive region 92 and the method of reading image data from the optical detector 10. In the preferred embodiment, the light sensitive region 92 has a resolution of 300 dots per inch (dpi), with 102 pixels at an 85 $\mu$m pitch, and eight interconnect pads 136 and 196-212 are used to read the image data from the 102 pixels.

The array of edge mounted optical detectors 190 comprises 14 individual edge mounted optical detectors (e.g., 10, 184, and 186), evenly spaced apart and mounted to the printed circuit board 42. The number of edge mounted optical detectors (e.g., 10, 184, and 186) used on the portable image scanner 12 depends upon the resolution desired and the length 192 of each optical detector (e.g., 10, 184, and 186). Alternatively, a single, edge mounted optical detector having a length substantially coextensive with the portable image scanner 12 may be used.

The array of edge mounted optical detectors 190 is mounted to the printed circuit board 42 in a manner similar to "Flip Chip" technology. Flip Chip is a system for interconnecting an integrated circuit on a semiconductor die to external input/output (I/O) pins in an integrated circuit package. Unlike the more common wire bonding method, no wires are placed between the semiconductor die and the external I/O pins. The Flip Chip semiconductor die is placed on its face against the mounting surface, with interconnect pads on the die aligned with corresponding interconnect pads on the mounting surface. The electrical connections are made in one operation in any of a variety of known techniques. For example, solder bumps may be formed on the interconnect pads prior to connection. Once the Flip Chip semiconductor die is placed face down with the solder bumps aligned, a solder reflow process is used to melt all the bumps and connect the die to the mounting surface. Conductive adhesives may also be placed on the interconnect pads and cured.

The array of edge mounted optical detectors 190 may be mounted to the printed circuit board 42 using typical Flip Chip mounting processes, except that the array of edge mounted optical detectors 190 are mounted to the printed circuit board 42 on their edges (e.g., 80) instead of their faces (e.g., 90). Thus, the light sensitive region 92 on the face 90 is aligned parallel with the printed circuit board 42, rather than directed into the printed circuit board 42 as it would be in a traditional Flip Chip process.

The array of edge mounted optical detectors 190 is preferably mounted to the printed circuit board 42 using a conductive epoxy, such as a silver filled epoxy. The edge 80 of an edge mounted optical detector 10 is placed against the printed circuit board 42 so that the semiconductor die ground pad 132 is aligned with a corresponding ground pad 130 on the printed circuit board 42, and so that the semiconductor die interconnect pads (e.g., 140) are aligned with the corresponding interconnect pads (e.g., 136) on the printed circuit board 42. A line or rope 82 of silver filled epoxy is dispensed between the elongated ground pads 132 and 130 on the semiconductor die and the printed circuit board. A bead or dot (e.g., 84) of silver filled epoxy is dispensed between each pair (e.g., 140 and 136) of interconnect pads on the semiconductor die and the printed circuit board. The rope 82 and beads (e.g., 84) are then simultaneously cured by applying heat according to the requirements of the silver filled epoxy. The edge mounted optical detector 10 is thus electrically connected and physically attached to the printed circuit board 42 by the silver filled epoxy in one operation, without additional wire bonds.

The optical system 44 comprises a rod lens array, or gradient index lens. A gradient index (GRIN) lens comprises an array of glass or plastic cylinders mounted side by side in a single housing. Each cylinder directs light by refraction due to a refractive index which smoothly varies from the center of the cylinder out to the edges. In a preferred embodiment, the optical system 44 may comprise a GRIN lens such as the type sold under the name SELFOC which is a registered trademark of the Nippon Sheet Glass Company, Limited, part number SLA-12A, having a height 96 of about 4.1 mm and a width 100 of about 0.95 mm. The optical system 44 is mounted to the front 172 of the printed circuit board 42 at a distance 146 of about 3 mm below the array of edge mounted optical detectors 190. The optical system 44 is mounted to the printed circuit board 42 using an adhesive layer 94 which has a thickness 150 of about 0.3 mm.

The width 126 of the edge mounted optical detectors (e.g., 10) in the array of edge mounted optical detectors 190 is calculated to position the light sensitive region (e.g., 92) over the optical axis of the optical system 44 so that the image light 52' is directed by the optical system 44 onto the light sensitive region 92. In the preferred embodiment, the width 126 of the array of edge mounted optical detectors 190 is calculated to position the optical axis of the image light 52' at a distance 142 of about 0.8 mm from the printed circuit board 42.

Figure 8:
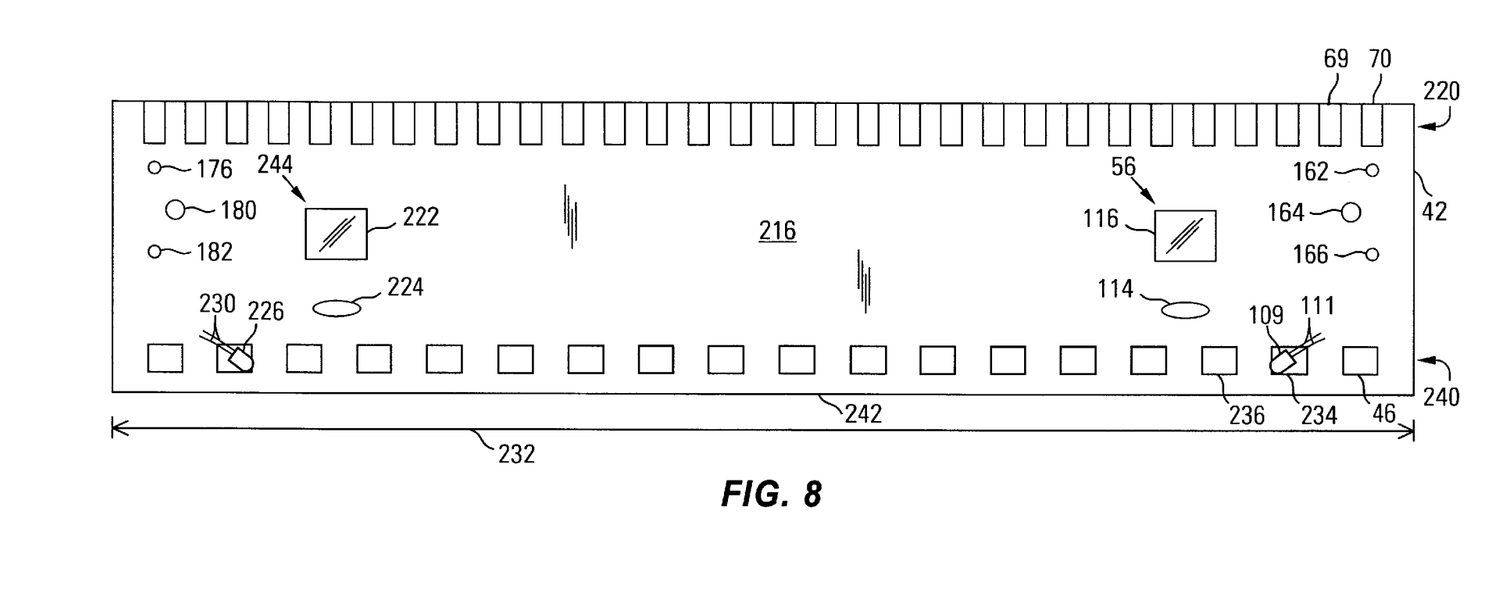
FIG. 8 is a rear view of the optical imaging assembly of FIG. 4.

An illumination source 240 is mounted to the printed circuit board 42 to illuminate a scan region 62 on the document 16 under the optical system 44. The illumination source 240 may comprise an array of light emitting diodes (LED's) (e.g., 46, 234, and 236) which may be positioned in spaced-apart relation on the back 216 of the printed circuit board 42, as illustrated in FIG. 8. The array of LED's (e.g., 46, 234, and 236) in the illumination source 240 may have a length that is substantially coextensive with the optical imaging assembly 40, which is likewise substantially coextensive with the length of the scan line 64. Each light emitting diode in the illumination source 240 may comprise an LED part number HSMA-S690, available from Hewlett-Packard Company of Palo Alto, Calif. The number of light emitting diodes provided in the illumination source 240 will depend on the length 232 of the optical imaging assembly 40 as well as on the desired intensity of the illumination that is to be provided to the scan region 62. By way of example, in one preferred embodiment, the illumination source 240 may be provided with eighteen (18) separate light emitting diodes (e.g., 46, 234, and 236). The illumination source 240 is mounted to the back 216 of the printed circuit board 42, and may be attached with an adhesive 108 and soldered wires (not shown). Alternatively, the illumination source 240 may be mounted to the printed circuit board 42 only by surface mount solder joints.

The light emitting diodes in the illumination source 240 utilized in one preferred embodiment produce a substantially uniform light output over a wide angle, nearly 180° in some cases. The light emitting diodes (e.g., 46, 234, and 236) are preferably edge mounted LED's, in which the illumination light 54 is directed parallel to the printed circuit board 42. The illumination source 240 may be positioned near the bottom 242 of the printed circuit board 42 so that the illumination light 54 spreads underneath the printed circuit board 42 toward the scan region 62.

Alternatively, a reflector 50 may be used to reflect the illumination light 50 toward the scan region 62. The reflector 50 comprises a reflective surface such as a mirror or polished metal. The reflector is either mounted to the light emitting diodes (e.g., 46, 234, and 236), the printed circuit board 42, or to the stabilizer 102 positioned under the printed circuit board 42.

During operation of the portable image scanner 12, the illumination source 240 produces illumination light 54 which travels substantially parallel to the printed circuit board 42 toward the reflector 50. Reflected illumination light 54' travels from the reflector 50 toward the scan region 62 on the document 16. Image light 52 is reflected from the scan line 64 on the document 16 toward the optical system 44. The optical system 44 directs the image light 52' onto the light sensitive regions (e.g., 92) on the edge mounted optical detector 10, which produces electrical signals representative of the image light 52.

One or more position detectors or navigators (e.g., 56) are mounted to the printed circuit board 42. In the preferred embodiment, two navigators 56 and 244 are mounted to the back 216 of the printed circuit board 42. Each navigator comprises a photodetector (e.g., 122) mounted to the printed circuit board 42 by soldered wires (e.g., 120 and 124). A pair of navigator LED's 109 and 226 are mounted to the printed circuit board 42 by soldered wires 111 and 230, respectively. The navigator LED's 109 and 226 produce navigator illumination light (e.g., 107) to illuminate portions of the document 16 through a pair of navigator windows (e.g., 104). Navigator image light (e.g., 106) is reflected from the portions of the document 16 toward navigator lenses 114 and 224 which are mounted to the printed circuit board 42 by mounting brackets (e.g., 112). The navigator lenses 114 and 224 focus and direct the navigator image light (e.g., 106') towards a pair of reflectors 116 and 222. Reflected navigator image light (e.g., 106") then travels to the navigator photodetectors (e.g., 122).

One or more image processing circuits 60 and memory circuits 170 and 174 are mounted to the front 172 of the printed circuit board 42 for processing and storing the image data produced by the array of edge mounted optical detectors 190. Printed circuit board locator holes 164 and 180 are located near the sides of the printed circuit board 42 to simplify alignment of the board 42 during manufacturing and assembly. Heat stake holes 162, 166, 176, and 182 are provided for mounting the optical imaging assembly 40 in the portable image scanner 12. Plastic stakes in the main housing portion 22 are passed through the heat stake holes 162, 166, 176, and 182 in the optical imaging assembly 40, and the ends of the heat stakes are then melted to hold the optical imaging assembly 40 in place.

An array 160 of connectors (e.g., 72, 73) is provided on the front 172 of the printed circuit board 42 near the top, with a corresponding array 220 of connectors (e.g., 69, 70) on the back 216. The arrays 160 and 220 of connectors allow the optical imaging assembly 40 to be easily connected to the other electronic circuitry inside the portable image scanner 12.

The optical imaging assembly 40 with the array of edge mounted optical detectors 190 provides a very compact imaging assembly for a portable image scanner 12, and reduces manufacturing costs by reducing the number of elements and eliminating wire bonds. Assembly is also simplified by mounting all components to a single mounting surface, easing assembly and reducing the tolerance stack. The total width 110 of the preferred embodiment, from the illumination source 240 to the optical system 44, is less than about 4 mm.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An optical imaging assembly, comprising:
   a mounting surface having a front portion;
   at least one semiconductor die having a face and an edge portion, said edge portion being mounted to said front portion of said mounting surface;
   a light sensitive optical detector located on said face of said at least one semiconductor die; and
   an optical system mounted to said front portion of said mounting surface adjacent said at least one semiconductor die.

2. The optical imaging assembly of claim 1, wherein said mounting surface comprises a printed circuit board.

3. The optical imaging assembly of claim 1, wherein said mounting surface comprises a flexible printed circuit board and at least one stiffening member contacting said flexible printed circuit board to provide support to said flexible printed circuit board.

4. The optical imaging assembly of claim 1, wherein said optical system comprises a gradient index lens.

5. The optical imaging assembly of claim 1, wherein said optical system is mounted to said front portion of said mounting surface with an adhesive.

6. The optical imaging assembly of claim 1, wherein said at least one semiconductor die is mounted on said edge portion to said front portion of said mounting surface with solder.

7. The optical imaging assembly of claim 1, wherein said at least one semiconductor die is mounted on said edge portion to said front portion of said mounting surface with conductive epoxy.

8. The optical imaging assembly of claim 7, wherein said conductive epoxy comprises silver filled epoxy.

9. The optical imaging assembly of claim 1, wherein said at least one semiconductor die comprises an elongate ground pad and a plurality of interconnect pads, and wherein said front portion of said mounting surface comprises an elongate mounting ground pad electrically connected to said ground pad and a plurality of mounting interconnect pads electrically connected to said plurality of interconnect pads.

10. The optical imaging assembly of claim 9, wherein said elongate ground pad is electrically connected to said elongate mounting ground pad with a rope of conductive epoxy, and wherein said plurality of interconnect pads are electrically connected to said plurality of mounting interconnect pads with a plurality of dots of conductive epoxy.

11. The optical imaging assembly of claim 1, said mounting surface further comprising a back portion opposite said front portion, said optical imaging assembly further comprising an illumination source mounted to said back portion of said mounting surface.

12. The optical imaging assembly of claim 11, wherein said optical imaging assembly has a width less than about 5 mm.

13. The optical imaging assembly of claim 11, wherein said illumination source comprises an array of light emitting diodes.

14. The optical imaging assembly of claim 11, further comprising a reflector adjacent said illumination source.

15. The optical imaging assembly of claim 1, further comprising at least one position detector mounted to said mounting surface.

16. The optical imaging assembly of claim 1, further comprising at least one memory circuit mounted to said mounting surface.

17. The optical imaging assembly of claim 1, further comprising an image processing circuit mounted to said mounting surface.

18. The optical imaging assembly of claim 1, further comprising an electrical connector for connecting said optical imaging assembly to an external electrical circuit.

19. A method of producing an imaging system comprising:
   providing at least one photodetector comprising a light sensitive face and an edge portion, wherein said light sensitive face and said edge portion intersect;
   connecting said edge portion of said at least one photodetector to a circuit board; and
   connecting a lens to said circuit board adjacent said at least one photodetector.

20. The method of claim 19, further comprising mounting an illumination source to said circuit board.

21. A method for assembling an optical imaging assembly comprising:
   providing at least one optical detector having a light sensitive face, an edge portion, and a first plurality of electrical contact pads placed adjacent said edge portion, wherein said light sensitive face and said edge portion intersect;
   providing a substrate having a second plurality of electrical contact pads corresponding to said first plurality of electrical contact pads;
   placing said edge portion of said at least one optical detector against said substrate;

aligning said first plurality of electrical contact pads with said second plurality of electrical contact pads; and electrically connecting said first plurality of electrical contact pads to said second plurality of electrical contact pads.

22. The method of claim 21, wherein electrically connecting said first and second pluralities of electrical contact pads comprises:

dispensing a plurality of portions of electrically conductive epoxy between each of said first and second pluralities of electrical contact pads; and curing said electrically conductive epoxy.

23. An optical imaging assembly, comprising:

a printed circuit board;

a plurality of photodetectors each having a light sensitive face and an edge, wherein said light sensitive face and said edge intersect; and means for mounting said edges of said plurality of photodetectors on said printed circuit board.

* * * * *